United States Patent [19]

Takeuchi

[11] Patent Number: 4,732,195
[45] Date of Patent: Mar. 22, 1988

[54] RADIAL TIRE TREAD FOR TRUCK OR BUS

[75] Inventor: Akihiro Takeuchi, Kobe, Japan

[73] Assignee: Sumitomo Rubber Industries, Ltd., Japan

[21] Appl. No.: 864,155

[22] Filed: May 16, 1986

[30] Foreign Application Priority Data

May 21, 1985 [JP] Japan .............. 60-75658[U]

[51] Int. Cl.$^4$ .............................. B60C 11/04
[52] U.S. Cl. .............................. 152/209 R
[58] Field of Search ............ 152/209 R, 209 D, 209 B

[56] References Cited

U.S. PATENT DOCUMENTS

| | | | |
|---|---|---|---|
| 3,707,177 | 12/1972 | Boileau | 152/209 R |
| 4,223,712 | 9/1980 | Iwata et al. | 152/209 R |
| 4,412,575 | 11/1983 | Maeda et al. | 152/209 B |
| 4,619,300 | 10/1986 | Tokunaga et al. | 152/209 R |

FOREIGN PATENT DOCUMENTS 2142885  1/1985  United Kingdom ........... 152/209 D

*Primary Examiner*—Michael Ball
*Attorney, Agent, or Firm*—Stevens, Davis, Miller & Mosher

[57] ABSTRACT

A radial tire for trucks or buses constructed to eliminate the drawback of shoulder wear and improve the its wet-grip performance and having a tread part, divided into at least five ribs with at least four circumferentially extending longitudinal grooves; auxiliary grooves interconnecting adjacent longitudinal grooves and dividing each of the ribs into separated blocks; and the depth of the auxiliary grooves gradually decreasing toward the shoulder part of the tire.

6 Claims, 3 Drawing Figures

AT 40% WEAR

AT 60% WEAR

RADIAL TIRE TREAD FOR TRUCK OR BUS

BACKGROUND OF THE INVENTION

This invention relates to a pneumatic radial tire for a truck or bus, which mitigates the shoulder wear without sacrificing the wet-grip performance.

Generally, the radial tire for use on a truck or a bus is provided with a carcass formed of cords which are substantially perpendicularly arranged to the equatorial plane of tire and a steel cord belt layer which is interposed between the carcass and the tread of the tire. Since a radial tire is superior to a bias ply tire in terms of abrasion resistance, puncture resistance, and fuel consumption, it is notably gaining popularity in recent years. In radial tires, however, the shoulder parts offer lower rigidity than the tread center and are liable to produce more relative motion, since the belt layer of high rigidity is disposed in the crown part of the tire. Such a radial tire suffer from more advanced abrasion against the road surface. Thus, the so-called shoulder abrasion, i.e., a phenomenon in which the wear of the tread of a tire proceeds more quickly in the shoulder parts than in the tread center, inevitably ensues.

In the meantime, all-season tires used for travel on wetroads including snow-covered roads prevalently adopts a block tread pattern. A block tread pattern, when used in the tire under a heavy load such as that of a truck or a bus, offers intolerably low abrasion resistance. Thus use of a tire incorporating a block tread pattern under such conditions generally proves high uneconomical.

BRIEF SUMMARY OF INVENTION

This invention is aimed at providing a radial tire which eliminates the drawback of shoulder abrasion inherent in the conventional heavy-duty radial tire and possesses improved grip performance on wet road surfaces or snow-covered road surfaces.

DETAILED DESCRIPTION OF THE INVENTION

This invention is directed to a radial tire for a truck or bus, comprising: a tread part, divided into at least five ribs with at least four circumferentially extending longitudinal grooves, and having auxiliary grooves forming each of the ribs into separated blocks by interconnecting the said adjacent longitudinal grooves; and the depth of the auxiliary grooves decreasing gradually toward the shoulder part of the tire.

Now, a working example of this invention will be described in detail below with reference to the accompanying drawings.

Figure 1:
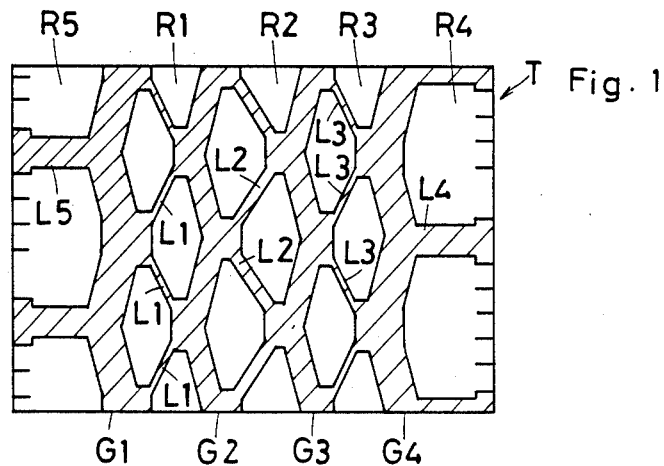
FIG. 1 is a partial plane view showing the tread part of the tire according to this invention.

In FIG. 1, four zigzag longitudinal grooves (G1, G2, G3, and G4) are arranged in the tread part T of the radial tire, and each extend in the circumferential direction of the tire. Then, the tread part T is divided into five ribs (R1, R2, R3, R4, and R5). In each of the ribs (R1, R2, R3, R4, and R5), the auxiliary grooves (L1, L2, L3, L4, and L5) are formed, so that each of the ribs is formed into separated blocks.

The auxiliary grooves L2 situated at the rib R2 are formed in the greatest depth. The auxiliary grooves (L1 and L3) situated at the ribs (R1 and R3) are formed with a smaller depth than the aforementioned central auxiliary grooves L2. The auxiliary grooves (L4 and L5) disposed in the ribs (R4 and R5) falling in the shoulder parts are formed at a large angle such as in the range of 70° to 90° with respect to the circumferential direction of the tire and in a relatively large width such as in the range of 50 to 120% of the width of the aforementioned longitudinal grooves.

Particularly, the auxiliary grooves (L4 and L5) are formed in a still smaller depth than the aforementioned auxiliary grooves (L1 and L3). Thus, the depths (D1, D2, D3, D4, and D5) of the aforementioned auxiliary grooves (L1, L2, L3, L4, and L5) satisfy the following relations relative to the average depth D0 of the longitudinal grooves G1–G4.

$$0.40\ D0 \leq D1 = D3 \leq 0.80\ D0$$

$$0.60\ D0 \leq D2 \leq 1.0\ D0$$

$$0.20\ D0 \leq D4 = D5 \leq 0.60\ D0$$

Figure 2:
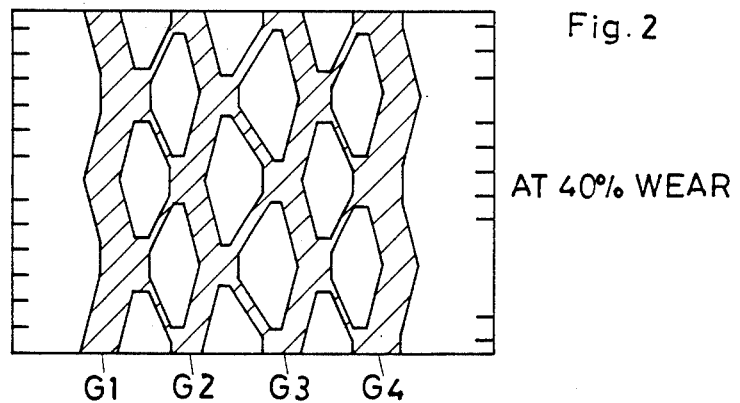
FIG. 2 is a partial plane view showing the aforementioned tread part after 40% wear.
Figure 3:
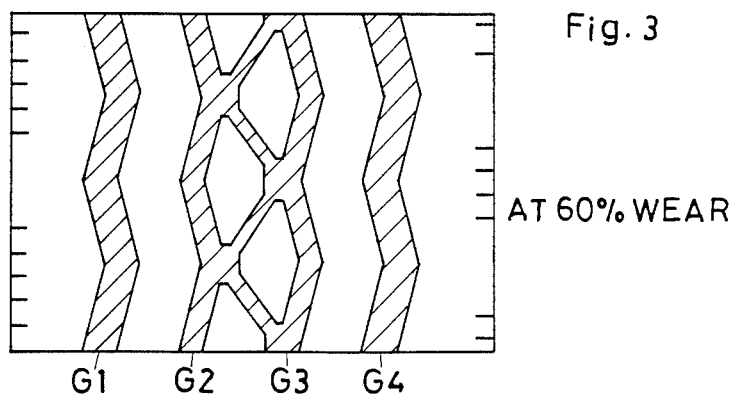
FIG. 3 is a partial plane view showing the same tread part after 60% wear.

By forming the auxiliary grooves L1–L5 as described above, the rigidity of the central part of the tread part T and the shoulder parts thereof can be balanced. Thus, with use of the tire, the shape of the tread part T varies in proportion to the amount of wear and the resistance of the tread part to shoulder abrasion can be improved in the whole stage of tread wear. The tire, therefore, is enabled to retain the grip performance on wet road surfaces or snow-covered road surfaces. To be specific, in the early stage of wear, after the treat part illustrated in FIG.1 has undergone 40% wear, the auxiliary grooves (L4 and L5) are no longer present as illustrated in FIG. 2. After the tread part has undergone 60% wear, the auxiliary grooves (L1 and L3) additionally vanish as illustrated in FIG. 3.

As described above, in the radial tire of this invention, the rigidity in the central part of the tread is moderated and the rigidity in the shoulder parts is enhanced so much as to preclude the phenomenon of shoulder abrasion, because the rib pattern incorporating a plurality of longitudinal grooves is designed that the depth of the auxiliary grooves additionally formed therein varies in the central part of the tread and in the shoulder parts thereof. Moreover, the block pattern formed by the aforementioned auxiliary grooves enables the tire to retain its wet-grip performance.

I claim:

1. A radial tire with a tread reinforcing belt for trucks or buses, comprising:
   at least four longitudinal grooves extending circumferentially to divide said tread into at least five parts;
   auxiliary grooves extending across said at least five parts of the tread to form at least five rows of circumferentially separated blocks; and
   the depth of the auxiliary grooves decreasing gradually toward the axially outside of the tread so that said rows of separated blocks change into continuous ribs from the axially outside to the inside of the tread in sequence as the tread wears.

2. The radial tire, as claimed in claim 1, wherein said auxiliary grooves across the axially outermost parts of said at least five parts of the tread, are arranged at an angle of 70 to 90° to the circumferential direction of the tire.

3. The radial tire, as claimed in claim 1, wherein said longitudinal grooves extend zigzag in the same mode and the auxiliary grooves extending between the adjacent longitudinal grooves are arranged zigzag of reverse mode to that of the zigzag of the longitudinal grooves to form a plurality of blocks of a diamond shape with their major axes extending circumferentially.

4. A radial tire with a tread reinforcing belt for trucks or buses, comprising:

four longitudinal grooves extending circumferentially to divide said tread into five parts including a center part, two shoulder parts, and two middle parts therebetween;

auxiliary grooves extending across said five parts of the tread to form five rows of circumferentially separated blocks; and the depth of said auxiliary grooves satisfying the following relation $D4 = D5 < D1 = D3 < D2$ $0.20\ DO \leq D4 = D5 \leq 0.60\ DO$ $0.40\ DO \leq D1 = D3 \leq 0.80\ DO$ $0.60\ DO \leq D2 \leq 1.00\ DO$ where D2 is the depth of the auxiliary grooves extending across said center part, D1 and D3 are the depth of the auxiliary groove extending across said middle parts, D4 and D5 are the depth of the auxiliary grooves extending across said shoulder parts, and D0 is the depth of the longitudinal grooves, whereby said five rows of separated blocks change into continuous ribs from the axially outside to inside of the tread in sequence as the tread wears.

5. The radial tire, as claimed in claim 4, wherein said auxiliary grooves across said should parts are arranged at an angle of 70° to 90° to the circumferential direction of the tire.

6. The radial tire, as claimed in claim 4, wherein said longitudinal grooves extend zigzag in the same mode and the auxiliary grooves extending between the adjacent longitudinal grooves are arranged zigzag of reverse mode to that of the zigzag of the longitudinal grooves to form a plurality of blocks of a diamond shape with their major axes extending circumferentially.

* * * * *